United States Patent

Yamaka et al.

[15] 3,660,776

[45] May 2, 1972

[54] MIRROR MEANS FOR LASER STRUCTURES

[72] Inventors: Eiso Yamaka; Norio Karube; Masakazu Akiyama, all of Osaka, Japan

[73] Assignee: Matsushita Electric Industrial Company, Limited, Osaka, Japan

[22] Filed: June 22, 1970

[21] Appl. No.: 48,206

[30] Foreign Application Priority Data

June 27, 1969 Japan.....................................44/51987

[52] U.S. Cl..............................................331/94.5, 350/288
[51] Int. Cl.....................................................H01s 3/04
[58] Field of Search................................331/94.5; 350/288

[56] References Cited

UNITED STATES PATENTS 3,493,892  2/1970  Witteman et al. ........................331/94.5

FOREIGN PATENTS OR APPLICATIONS 1,548,639  12/1968  France.................................331/94.5

Primary Examiner—Ronald L. Wibert
Assistant Examiner—F. L. Evans
Attorney—McCarthy, Depaoli & O'Brien

[57] ABSTRACT

A mirror means used in a gas laser structure for permitting an infra-red laser beam to pass therethrough comprising a substrate plate made of an infra-red transparent material and secured air-tightly to the one end of the laser tube, the central portion of the substrate plate being made thinner than the remaining portion and sized substantially larger than the sectional area of the output laser beam, and a reflective metal film coated on the inner surface of the remaining portion. The mirror means is free from being destroyed by a high temperature increase and has a light absorption reduced to a minimum at the central recessed portion, thus providing an utmost high output power.

4 Claims, 1 Drawing Figure

PATENTED MAY 2 1972 3,660,776
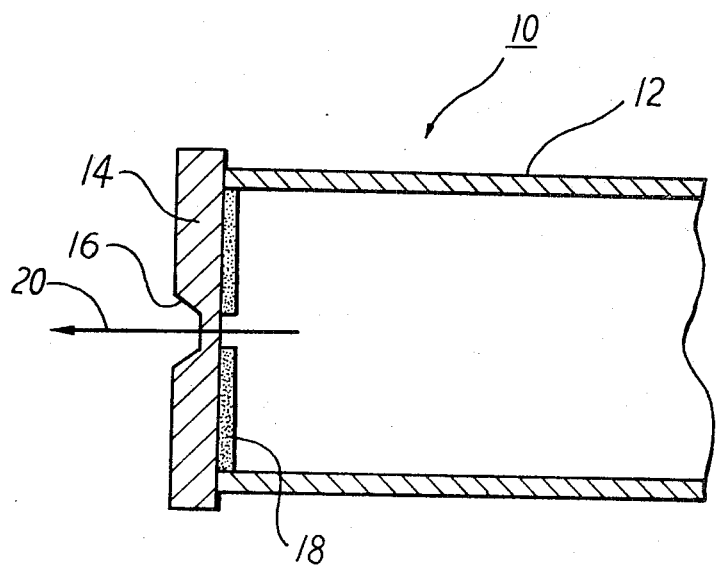
INVENTORS
EISO YAMAKA
BY NORIO KARUBE
MASAKAZU AKIYAMA
McCarthy, *depost* & O'Brien
ATTORNEYS

MIRROR MEANS FOR LASER STRUCTURES

This invention relates to lasers and particularly to so-called gas laser structures wherein the laser material is energized to establish a laserable inversion of energy states thereof. In a more particular sense, the invention relates to improvements in the mirror means employed especially in the infra-red gas laser structures.

In order to obtain an output coupling from a gas laser system, one reflective end of a laser cavity is made locally transparent. The reflective end acting as a mirror means is conventionally made of a semiconductor material which is transparent to an infra-red radiation. The semiconductor material is, for example, germanium or a sintered semiconductor which is known under the trade name of "Irtran." Difficulties are, however, encountered in the conventional mirror means; an undesirable light absorption takes place as a result of generation of the so-called free carrier, resulting in the deterioration of the transparency of the mirror means.

During operation of the gas laser system, the temperature of the mirror means is increased by the light absorbed. This invites the generation of the free carriers, which in turn increases absorption of the incident light. The temperature increase resulting from the increased light absorption further produces more free carriers. This undesirable cycle is repeated again and again, reducing the output laser power.

There have been proposed two methods to prevent such power deterioration; one is to employ highly resistive material as a reflecting material so as to suppress the generation of the free carriers, and the other is to make the mirror means thinner, as will be hereinafter discussed. In the former method, germanium has, by way of example, resistivity at most of 50 Ωcm. Moreover, there is an exacting limitation in the materials applicable for the mirror means because of the reflecting properties thereof even if their resistivities are sufficiently high.

The latter method is, on the other hand, based on the empirically derived formula as follows: $P_{out} = P_o \exp(-\alpha t)$, where $P_{out}$ is an output power of the laser system,
$P_o$ is an output power of the system in the absence of the light absorption by the mirror means,
$\alpha$ is an absorption coefficient of the mirror means employed, and
$t$ is the thickness of the mirror means.

From the above formula, the output power $P_{out}$ of the laser system is assumed to decrease for a constant absorption coefficient as an exponential function of the thickness $t$ of the mirror means. This implies that the output power obtainable can approach closely to its ideal value $P_o$ if the mirror means is made as thin as possible. A problem is, however, still experienced in this method. As previously described, the cavity ends are adapted to act not only as a reflective means but as an air-tight sealing member so that too thin mirror means is warped or made convex internally by the action of the vacuum prevailing in the laser cavity. For the convex mirror means, the bidirectionally reflected light in the laser cavity is made divergent when incident on the convex surface, thus degrading the Q or quality factor of the mirror means.

It is therefore an object of this invention to provide an improved mirror means to be employed in the resonant gas laser structures.

Another object of the invention is to provide an improved mirror means comprising a substrate plate made of an infra-red transparent material and secured air-tightly to the one end of the laser body, the central limited portion of the substrate plate being made thin enough to minimize the generation of the free carriers, and reflective metal film coated on the inner surface of the substrate plate which is thicker than the central portion.

Reference is now made to the accompanying drawing, which shows an axial section of the laser structure provided with a mirror means according to this invention.

In the drawing, there is illustrated a laser structure as generally designated by numeral 10, which is preferably applied for the structure of gas laser type. The laser structure 10 comprises as customary an evacuated laser tube 12 forming laser cavity therein, a substrate plate 14 secured air-tightly to the output end of the laser tube 12, the central portion 16 of which has a predetermined reduced thickness to permit an output laser beam to pass therethrough, and a reflective metal film 18 coated on the inner surface of the substrate plate 14 excepting the central thin portion 16. Designated by numeral 20 is an output laser beam passing through the central portion 16. The substrate plate 14 may be preferably made of an infra-red transparent semiconductor including not only germanium and Irtran but silicon and gallium arsenide. The reflective metal film 18 is, for example, made of gold, silver or alminum coated by vacuum evaporation on the inner surface of the thicker portion of the substrate plate 14.

The central thin portion 16 is so sized as to be substantially larger than the sectional area of the output laser beam 20. The thickness of the central portion 16 is determined in a manner to decrease the generation of the free carriers and to have a mechanical strength sufficient to withstand the warping force resulting from the difference between the ambient pressure and the vacuum prevailing in the laser cavity. The central recessed portion 16 is formed by scooping out the central portion of the substrate plate 14 and thereafter by polishing the outer surface thereof. The corresponding inner surface of the substrate plate 14, remaining uncoated with the reflective metal film 18, may be coated with an anti-reflection film if desired. This film will serve to minimize unnecessary multiple reflection of the output laser beam 20 thereon.

With these construction arrangement, the substrate plate 14 is secured air-tightly to the output end of the laser tube 12. At this instant, care should be taken to dispose the substrate plate 14 exactly perpendicularly of the axis of the laser tube 12. After sealing off the laser tube 12 in this manner, the laser structure 10 is evacuated and is filled with suitable gas or gases. The other mirror means disposed opposite to the modified mirror means and two electrodes for discharging the contained gas molecules are omitted in the drawing. The opposite mirror means may be coated thereon internally with the reflective metal film.

When in operation, a portion of the light emitted from the excited gas atoms is reflected back and forth in the laser cavity between the two reflective mirror means, undergoing multiple bidirectional reflections. These two mirror means are coated with the reflective metal film so that they can reflect the incoming light without substantial attenuation. After a number of repetition of such reflection, a major portion of the light is permitted to pass through the central recessed portion which is partially transmissive. The fraction of the light escaping therethrough thus brings about a desired output laser beam.

It will now be appreciated from the foregoing description that, according to one important aspect of the invention, the temperature increase of the modified mirror means is suppressed within a low level. This prevents the mirror means per se from being destroyed by the high temperature increase, which would occur without use of the laser structure of the invention. The restricted temperature increase will permit of a wide selection of an infra-red transparent materials applicable as a substrate plate, because of the high reflection properties within a limited low temperature range. According to another important aspect of the invention, the light absorption is reduced to a minimum at the central recessed portion, thus providing an utmost high output power.

What is claimed is:

1. In a gas laser structure with an evacuated laser tube the improvement comprising a plane mirror secured air-tightly to one end of said laser tube, said mirror disposed perpendicular to the axis of the laser tube and having a substrate plate made of an infra-red transparent material coated with a reflective metal film on its inner surface, said film coating the inner surface of said substrate plate except for a central portion thereof, said central portion sized substantially larger than a sectional area of the output laser beam and having a thickness smaller than that of the remaining portion of said substrate plate, the thickness of said central portion is such that the generation of free carriers is minimized therein and the mechanical strength is sufficient to withstand the warping force resulting from the difference between the ambient pressure and the vacuum prevailing in the tube.

2. A mirror means according to claim 1, wherein said infrared transparent material is selected from the semiconductor group consisting of germanium, Irtran, silicon and gallium arsenide.

3. A mirror means according to claim 1, wherein said reflective metal film is selected from the group consisting of gold, silver and aluminum.

4. A mirror means according to claim 1, further comprising an anti-reflection film coated on the inner surface of said central portion.

* * * * *